United States Patent Office 3,843,441
Patented Oct. 22, 1974

3,843,441
METHOD OF PRODUCING L-SERINE BY FERMENTATION
Koji Kubota, Kawasaki, and Takiko Onoda and Shinji Okumura, Tokyo, Japan, assignors to Ajinomoto Co., Inc., Tokyo, Japan
No Drawing. Filed Feb. 12, 1973, Ser. No. 331,774
Claims priority, application Japan, Feb. 22, 1972, 47/18,358
Int. Cl. C12d 13/06
U.S. Cl. 195—30                                4 Claims

ABSTRACT OF THE DISCLOSURE

L-Serine is produced in good yields by fermentation of aqueous media containing carbohydrates, acetic acid, or ethanol as carbon sources by means of artificially induced mutants of *Brevibacterium lactofermentum* and *Corynebacterium acetoacidophilum* capable of growing in the presence of enough sulfaguanidine sharply to reduce the growth rate of the respective parent strains which are unable to produce L-serine.

---

This invention relates to a method of producing L-serine by fermentation.

L-serine, hereinafter referred to as serine, has been used as a food supplement, and in medical research.

Serine was produced heretofore by converting glyceric acid or glycine to serine with microorganisms. (British Patent No. 1,207,096; U.S. Pat. No. 3,623,952). This process is however very expensive because of high cost of glyceric acid or glycine.

To prepare serine by fermentation at lower cost, it is essential to employ carbon sources available at low cost as carbohydrates, acetic acid and ethanol. U.S. Pat. No. 3,692,628 discloses the production of serine from hydrocarbons with auxotrophs requiring isoleucine. However, the yield of serine in this process is very low.

It has now been found that sulfaguanidine resistant mutants of parent strains of Brevibacterium and Corynebacterium produce serine from carbohydrates, acetic acid or ethanol in an extremely high yield when they are cultured in an aqueous culture medium.

The method of mutation is conventional such as exposure of cells of the parent strains to ultra-violet light, X-rays, or gamma rays in mutagenic doses, or to sodium nitrite, nitrosoguanidine, or diethylsulfate solution in a manner conventional in itself. The mutants resistant to sulfaguanidine are selected from the exposed parent strains by conventional methods. The exposed parent strains are cultured on an agar medium or in an aqueous medium containing enough sulfaguanidine to inhibit growth of the parent strains. Then, the mutants resistant to the sulfaguanidine are screened.

Resistance of a mutant to sulfaguanidine is determined by comparing the relative growth of the mutant strain on sulfaguanidine containing medium with that of the parent strain as a whole. The relative growth is the ratio of growth on a sulfaguanidine containing medium to growth on a medium which is free from sulfaguanidine.

The most effective serine-producing mutants found so far are *Brevibacterium lactofermentum* AJ 3360 (FERM–P 1371) and *Corynebacterium acetoacidophilum* O–472 (FERM–P 1372). Specimen cultures of each microorganism identified by FERM–P number are freely available to qualified persons without our permission from the Fermentation Research Institute, Agency of Industrial Science and Technology at 1–8–5, Inage-higashi, Chibashi, Chiba, Japan.

The respective parents strains are *Brevibacterium lactofermentum* ATCC 13869 and *Corynebacterium acetoacidophilum* ATCC 13870. They are incapable of producing serine in a culture medium.

Relative growths of the specimen culture and their parent strains in the presence of sulfaguanidine are shown in Table 1.

The nutrient media fermented by means of the microorganisms of this invention are conventional in themselves and contain at least one carbon source selected from carbohydrates, acetic acid and ethanol, assimilable sourcess of nitrogen, and inorganic salts. Minor amounts of organic nutrients such as vitamins and amino acids may be added to increase yield of serine or to promote microbial growth. Suitable carbohydrates include glucose, sucrose, starch hydrolyzates, and molasses. Assimilable nitrogen sources include organic or inorganic nitrogen-containing compounds such as nitrates, ammonium salts, gaseous ammonia, ammonium hydroxide solution and urea.

For a good yield of serine, the fermentation is carried out aerobically with aeration and/or agitation. Best yield requires pH control within the range of 5 to 9. The desired pH may be maintained by adding gaseous or aqueous ammonia, calcium carbonate, alkali metal hydroxide, urea, organic or inorganic acids to the medium from time to time, some of which may also supply assimilable nitrogen. When the fermentation is carried out at 24° C. to 37° C., the concentration of serine in the broth reaches its maximum within 2 to 7 days.

The serine accumulated in the fermentation broth can be recovered by conventional methods, such as removing cells by filtration or centrifugation, passing the broth over an ion exchange resin and precipitation at the isoelectric point of serine.

The following examples further illustrate the invention.

Example 1

*Brevibacterium lactofermentum* AJ–3360 was cultured at 31.5° C. for 16 hours with shaking in an aqueous medium containing 3 g./dl. glucose, 0.3 g./dl. urea, 0.1 g./dl. $KH_2PO_4$, 0.04 g./dl. $MgSO_4 \cdot 7H_2O$, 0.2 mg./dl. ferrous ion, 0.2 mg./dl. manganese ion, 50 µg./l. biotin, 200 µg./l. thiamine, HCl, 1 ml./dl. soy protein acidhydrolyzate and 0.2 g./dl. yeast extract.

An aqueous fermentation medium was prepared to contain 10 g./dl. glucose, 5 g./dl. $(NH_4)_2 SO_4$, 0.1 g./dl. $KH_2PO_4$, 0.04 g./dl. $MgSO_4 7H_2O$, 0.2 mg./dl. ferrous ion, 0.2 mg./dl. manganese ion, 50 µg./l. biotin, 100 µg./l. thiamine HCl, 0.3 g./dl. soy protein acid-hydrolyzate and 5 g./dl. $CaCO_3$ and adjusted to pH 7.0. 300 ml. batches of the fermentation medium were placed in 1,000 ml. fermentation vessels, sterilized by steam, and inoculated with 15 ml. of the cultured broth mentioned above. Fermentation was carried out aerobically at 31.5° C. for 55 hours. After the cultivation, 0.20 g./dl. serine was found in the fermentation broth. Two liters of combined fermentation broth were passed through "Amberlite" IR–45 (OH-type) after separating cells by centrifuging. The elute was concentrated, mixed with 2.5 volumes of methanol, and cooled, 3.5 g. of crude crystals of serine were obtained.

*Corynebacterium acetoacidophilum* D–472 was cultured by the same method as mentioned above, and 0.22 g./dl. serine was found in the fermentation broth.

Example 2

*Brevibacterium lactofermentum* AJ 3360 was cultured at 31.5° C. for 16 hours with shaking in an aqueous culture medium containing 1.5 g./dl. glucose, 0.3 g./dl. ammonium acetate, 0.1 g./dl. urea, 0.1 g./dl. $KH_2PO_4$, 0.04 g./dl. $MgSO_4 \cdot 7H_2O$, 0.2 mg./dl. ferrous ion, 0.2 mg./dl. manganese ion, 50 µg./l. biotin, 100 µg./l. thiamine HCl, 1 ml./dl. soy protein acid-hydrolyzate and 0.2 g./dl. yeast extract.

An aqueous fermentation medium was prepared to contain 3 g./dl. glucose, 0.7 g./dl. ammonium acetate, 0.5 g./dl. $(NH_4)_2SO_4$, 0.1 g./dl. urea, 0.1 g./dl. $KH_2PO_4$, 0.04 g./dl. $MgSO_4 \cdot 7H_2O$, 0.2 mg./dl. ferrous ion, 0.2 mg./dl. manganese ion, 50 µg./l. biotin, 100 µg./l. thiamine HCl and 1 ml./dl. soy protein acid-hydrolyzate, and adjusted to pH 7.2.

300 ml. batches of the fermentation medium were placed in 1,000 ml. fermentation vessels, and inoculated with 15 ml. of the culture broth mentioned above. Fermentation was carried out aerobically at 31.5° C. During the fermentation, acetic acid solution (containing 1 molar part of acetic acid and 0.2 molar part ammonium acetate; the concentration of acetate being 60 g./dl.) was fed maintaining pH at 7.2 to 8.0.

After 48 hours cultivation, 0.43 g./dl. serine were found in the fermentation broth.

*Corynebacterium acetoacidophilum* 0–472 was cultured by the same method as mentioned above, and 0.51 g./dl. serine was found in the fermentation broth.

Example 3

An aqueous medium was prepared to contain 1.5 g./dl. glucose, 1.5 g./dl. ethanol, 0.5 g./dl. $(NH_4)_2 \cdot SO_4$, 0.04 g./dl. $MgSO_4 \cdot 7H_2O$, 0.2 mg./dl. ferrous ion, 0.2 mg./dl. manganese ion, 50 µg./l biotin, 100 µg./l. thiamine HCl, 1 ml./dl. soy protein acid-hydrolyzate, and adjusted to pH 7.2, 15 ml. of the inoculum of *Brevibacterium lactofermentum* AJ 3360 described in Example 1 was put into the fermentation vessel together with the medium.

Fermentation was carried out aerobically at 31.5° C. During the fermentation, the pH of the medium was maintained at 7.0 to 7.5 by introducing gaseous ammonia, and the ethanol concentration was maintained at about 0.3 g./dl. by feeding 70% ethanol solution.

After 48 hours cultivation, 58.8 g. of ethanol was consumed and 0.37 g./dl. serine were found in the fermentation broth.

*Corynebacterium acetoacidophilum* 0–472 was cultured by the same method as mentioned above, 0.35 g./dl. serine was found in the fermentation broth.

Medium: 2 g./dl. glucose, 1 g./dl. $(NH_4)_2SO_4$, 0.1 g./dl. $KH_2PO_4$, 0.04 g./dl. $MgSO_4 \cdot 7H_2O$, 0.2 g./dl. ferric ion, 0.2 g./dl. manganese ion, 100 µg./l. biotin, 200 µg./l. thiamin HCl, 2 g./dl. $CaCO_3$ (separately stirilized), pH 7.0.

Cultivation: Shaking culture in test tube,
Inoculum; $5 \times 10^7$ N/ml.,
Temperature: 31° C., Cultivation time 24 hours

What is claimed is:

1. A method of producing L-serine which comprises:
   (a) culturing an L-serine-producing mutant of a parent strain of *Brevibacterium lactofermentum* or *Corynebacterium acetoacidophilum* under aerobic conditions in an aqueous fermentation medium containing assimilable sources of carbon and nitrogen, and inorganic salts necessary for the growth of said mutant until a substantial amount of L-serine accumulates in said medium,
      (1) said carbon source being selected from the group consisting of carbohydrates, acetic acid, and ethanol,
      (2) the growth rate of said mutant on a culture medium containing enough sulfaguanidine to inhibit growth of said parent strain being substantially greater than the growth rate of said parent strain; and
   (b) recovering the accumulated L-serine from said fermentation medium.

2. A method as set forth in claim 1, wherein said mutant is *Brevibacterium lactofermentum* FERM-P 1371.

3. A method as set forth in claim 1, wherein said mutant is *Corynebacterium acetoacidophilum* FERM-P1372.

4. A method as set forth in claim 1, wherein said parent strain is unable to produce L-serine when cultured in said fermentation medium.

References Cited
UNITED STATES PATENTS 3,692,628    9/1972    Nakayama et al. _____ 195—47

ALVIN E. TANENHOLTZ, Primary Examiner

U.S. Cl. X.R.

195—47, 49

TABLE 1

| Sulfaguanidine added (rg./ml.) | Relative growth of— | | | |
|---|---|---|---|---|
| | Brev. lactofermentum FERM-P 1371 | Brev. lactofermentum ATCC 13869 | Corny. acetoacidophilum FERM-P 1372 | Corym. acetoacidophilum ATCC 13870 |
| 0 | 100 | 100 | 100 | 100 |
| 100 | 100 | 73 | 101 | 71 |
| 200 | 90 | 38 | 90 | 39 |
| 300 | 83 | 8.2 | 86 | 9.1 |
| 400 | 66 | 5.5 | 72 | 4.5 |
| 500 | 59 | 1.1 | 56 | 0.7 |
| 750 | 36 | 0.9 | 38 | 0.6 |
| 1,000 | 29 | 0.7 | 34 | 0.6 |